(12) United States Patent
Joko et al.

(10) Patent No.: US 11,882,922 B2
(45) Date of Patent: Jan. 30, 2024

(54) STORAGE CASE

(71) Applicants: SUMITOMO ELECTRIC OPTIFRONTIER CO., LTD., Yokohama (JP); SUMITOMO ELECTRIC INDUSTRIES, LTD., Osaka (JP)

(72) Inventors: Kazufumi Joko, Yokohama (JP); Shohei Ido, Yokohama (JP); Yasuhiro Sakamoto, Osaka (JP)

(73) Assignees: SUMITOMO ELECTRIC OPTIFRONTIER CO., LTD., Yokohama (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 181 days.

(21) Appl. No.: 17/419,577

(22) PCT Filed: Jan. 9, 2020

(86) PCT No.: PCT/JP2020/000534
§ 371 (c)(1),
(2) Date: Jun. 29, 2021

(87) PCT Pub. No.: WO2020/158336
PCT Pub. Date: Aug. 6, 2020

(65) Prior Publication Data
US 2022/0007817 A1 Jan. 13, 2022

(30) Foreign Application Priority Data
Jan. 29, 2019 (JP) .................................. 2019-013270

(51) Int. Cl.
*A45F 3/04* (2006.01)
*G02B 6/25* (2006.01)
(Continued)

(52) U.S. Cl.
CPC .................. *A45F 3/04* (2013.01); *G02B 6/25* (2013.01); *G02B 6/255* (2013.01); *A45F 2003/003* (2013.01)

(58) Field of Classification Search
CPC ........ A45F 2003/003; A45F 4/02; G02B 6/25; G02B 6/255
(Continued)

(56) References Cited

U.S. PATENT DOCUMENTS 3,514,172 A * 5/1970 Buchman ................. B41J 29/04
312/215
4,934,549 A * 6/1990 Allen ....................... A45C 11/20
220/520
(Continued)

FOREIGN PATENT DOCUMENTS

CN 204422816 U 6/2015
CN 206975298 U 2/2018
(Continued)

Primary Examiner — Scott T McNurlen
(74) Attorney, Agent, or Firm — Oliff PLC

(57) ABSTRACT

A storage case including a fusion splicer accommodating portion, an optical fiber cutter accommodating portion, an optical fiber cutter holder, and a support portion. The fusion splicer accommodating portion includes a first placement surface. The optical fiber cutter holder has a second placement surface configured to fix a bottom surface of an optical fiber cutter, and is supported to be rotatable around a rotating shaft separated from a plane including the first placement surface. The support portion is disposed between the fusion splicer accommodating portion and the optical fiber cutter accommodating portion. The support portion is in contact with the optical fiber cutter holder which has rotated such that an angle formed by a line normal to the first placement surface and a line normal to the second placement surface is an acute angle, to support the optical fiber cutter holder.

19 Claims, 14 Drawing Sheets

(51) Int. Cl.
*G02B 6/255* (2006.01)
*A45F 3/00* (2006.01)

(58) Field of Classification Search
USPC .............................. 224/623, 646–647, 270
See application file for complete search history.

(56) References Cited

U.S. PATENT DOCUMENTS

| | | | | |
|---|---|---|---|---|
| 5,242,056 | A * | 9/1993 | Zia | A45C 15/00 |
| | | | | 190/110 |
| 6,578,708 | B2 * | 6/2003 | Barnett | A45C 13/02 |
| | | | | 206/320 |
| 7,331,461 | B2 * | 2/2008 | MacKinnon | A45C 13/02 |
| | | | | 206/553 |
| 2014/0157830 | A1 | 6/2014 | Kawanishi | |

FOREIGN PATENT DOCUMENTS

| | | |
|---|---|---|
| JP | 2006-201305 A | 8/2006 |
| JP | 2010-039002 A | 2/2010 |
| JP | 2011-145528 A | 7/2011 |
| JP | 2014-074796 A | 4/2014 |

* cited by examiner

STORAGE CASE

TECHNICAL FIELD

The present disclosure relates to a storage case.

This application claims the benefit of priority from Japanese Patent Application No. 2019-013270, filed on Jan. 29, 2019, which is herein incorporated by reference in its entirety.

BACKGROUND ART

Patent Literatures 1 to 4 disclose a case which stores a fusion splicer that fusion splices optical fibers by heat melting, and a workbench on which the fusion splicer is mounted to be provided for work.

CITATION LIST

Patent Literature

Patent Literature 1: Japanese Unexamined Pater Publication No. 2014-74796
Patent Literature 2: Japanese Unexamined Patent Publication No. 2006-201305
Patent Literature 3: Japanese Unexamined Patent Publication No. 2011-145528
Patent Literature 4: Japanese Unexamined Patent Publication No. 2010-39002

SUMMARY OF INVENTION

The present disclosure provides a storage case. The storage case is configured to store a fusion splicer that splices optical fibers by heat melting, and an optical fiber cutter that cuts an optical fiber together, and also serves as a work tray. The storage case includes a fusion splicer accommodating portion, an optical fiber cutter accommodating portion, an optical fiber cutter holder, and a support portion. The fusion splicer accommodating portion includes a first placement surface configured to fix a bottom surface of the fusion splicer, and is configured to store the fusion splicer. The optical fiber cutter accommodating portion is configured to store the optical fiber cutter, the optical fiber cutter accommodation portion being disposed side by side with the fusion splicer accommodating portion in a direction along the first placement surface. The optical fiber cutter holder has a second placement surface configured to fix a bottom surface of the optical fiber cutter, and is supported to be rotatable around a rotating shaft separated from a plane including the first placement surface. The support portion is disposed between the fusion splicer accommodating portion and the optical fiber cutter accommodating portion in the direction along the first placement surface. The support portion is in contact with the optical fiber cutter holder which has rotated such that an angle formed by a line normal to the first placement surface and a line normal to the second placement surface is an acute angle, to support the optical fiber cutter holder.

The present disclosure provides a storage case. The storage case is configured to store a fusion splicer which splices optical fibers by heat melting, and an optical fiber cutter which cuts an optical fiber. The storage case includes a base, an optical fiber cutter holder, and a lid. The base includes a first placement surface which is configured such that the fusion splicer is placed on the first placement surface, and opens in a normal direction of the first placement surface. The optical fiber cutter holder includes a second placement surface which is configured such that the optical fiber cutter is placed on the second placement surface. The lid is connected to the base so as to be openable and closeable with respect to the base, and is configured to block an opening of the base when the lid is closed with respect to the base. The lid defines a space, which stores the optical fiber cutter, inside the lid. The optical fiber cutter holder is connected to the lid so as to be rotatable around a rotating shaft from a first position at which the optical fiber cutter is in a storage state to a second position at which the optical fiber cutter is in a usable state.

DESCRIPTION OF EMBODIMENTS

Figure 1:
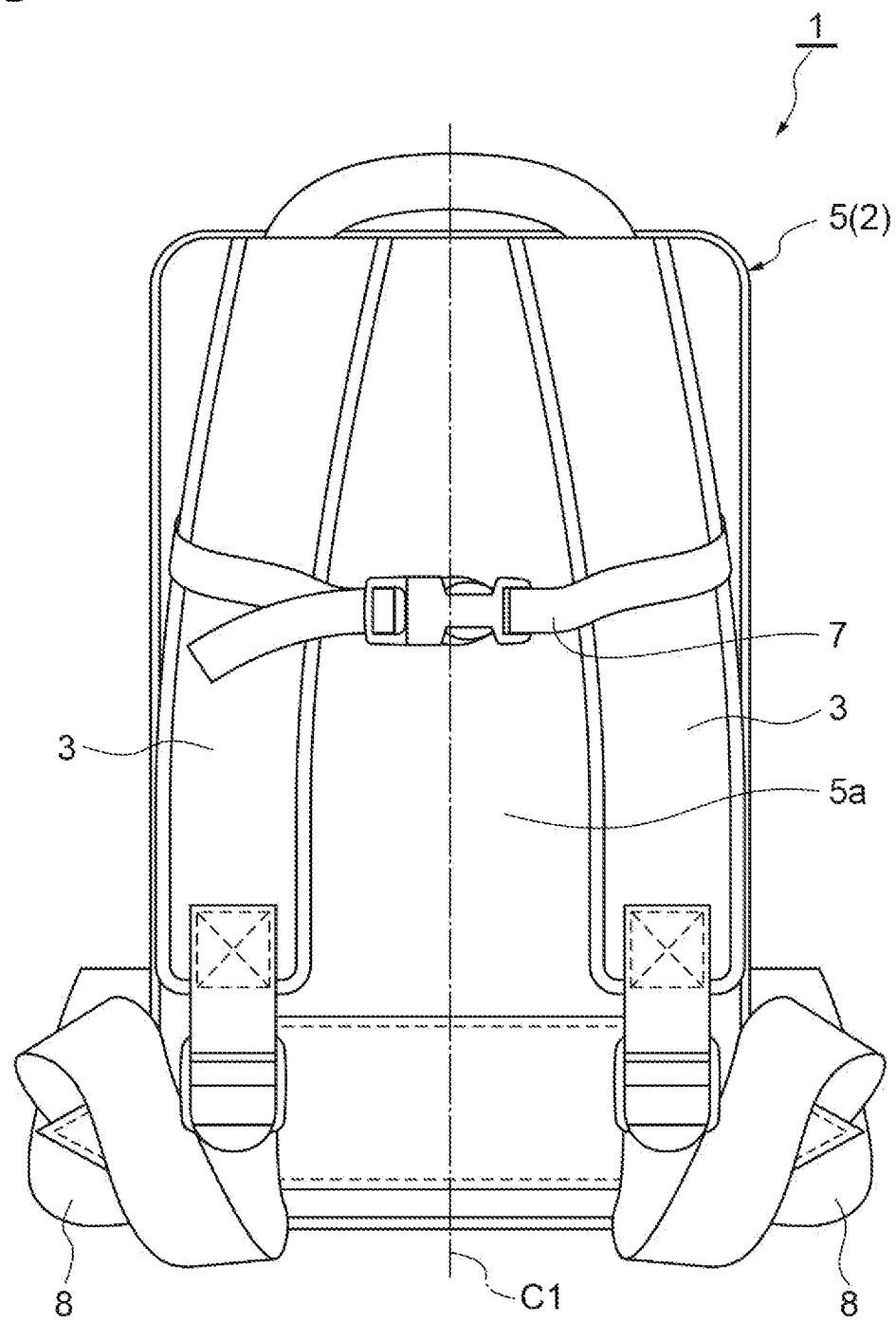
FIG. 1 is a front view illustrating the external appearance of a storage case according to one embodiment, and illustrates a state where the storage case is closed.

[Problem to be Solved by Present Disclosure]

When the fusion splicer is carried to a construction site, a case which stores the fusion splicer is required. In addition, when fusion splicing work is performed at the construction site, a workbench on which the fusion splicer and other devices (for example, an optical fiber cutter) that preprocess an optical fiber are placed is required. In the related art, the case and the workbench are formed as articles separate from each other. Therefore, after the fusion splicer is stored in the case to be brought into the construction site, a process of extracting the fusion splicer from the case to set the fusion splicer on the workbench is required, which is one factor that makes the fusion splicing work complicated.

In response to such a problem, for example, in an optical fiber fusion splicing system described in Patent Literature 1, a storage box which stores the fusion splicer also serves as the workbench. Accordingly, the process of extracting the fusion splicer from the case to set the fusion splicer on the workbench can be omitted. However, the storage box described in Patent Literature 1 does not have a space that stores the optical fiber cutter. Therefore, a process of extracting the optical fiber cutter from a dedicated storage case to set the optical fiber cutter at a predetermined position in the storage box is still required.

Here, in a case where the storage case has both a function of storing the fusion splicer and the function of the workbench, the following problem may occur when the optical fiber cutter is to be stored together in the storage case. In general, the fusion splicer is a larger than the optical fiber cutter, and the height from a bottom surface of the fusion splicer to a work position (portion in which the optical fiber is installed) is higher than the height from a bottom surface of the optical fiber cutter to the work position. For this reason, when the fusion splicer and the optical fiber cutter are installed side by side on surfaces of the same height, the work position of the optical fiber cutter which performs work beforehand is lower than the work position of the fusion splicer which performs work later, so that workability is decreased. Therefore, it is considered that a difference in height between the surface on which the fusion splicer is installed and the surface on which the optical fiber cutter is installed in the storage case is provided to align the work positions thereof with each other. However, in that case, since a waste space is formed below the optical fiber cutter, a reduction in size of the storage case is prevented.

An object of the present disclosure is to provide a storage case that can store a fusion splicer and an optical fiber cutter together, can be used as a workbench therefor, and can be reduced in size.

[Effect of Present Disclosure]

According to the present disclosure, it is possible to provide the storage case that can store the fusion splicer and the optical fiber cutter together, can be used as a workbench therefor, and can be reduced in size.

[Description of Embodiment of Present Disclosure]

Initially, an embodiment of the present disclosure will be listed and described. According to one embodiment of the present disclosure, there is provided a storage case that is configured to store a fusion splicer that splices optical fibers by heat melting, and an optical fiber cutter that cuts an optical fiber together, and also serves as a work tray. The storage case includes a fusion splicer accommodating portion, an optical fiber cutter accommodating portion, an optical fiber cutter holder, and a support portion. The fusion splicer accommodating portion includes a first placement surface configured to fix a bottom surface of the fusion splicer, and is configured to store the fusion splicer. The optical fiber cutter accommodating portion is configured to store the optical fiber cutter, the optical fiber cutter accommodation portion being disposed side by side with the fusion splicer accommodating portion in a direction along the first placement surface. The optical fiber cutter holder has a second placement surface configured to fix a bottom surface of the optical fiber cutter, and is supported to be rotatable around a rotating shaft separated from a plane including the first placement surface. The support portion is disposed between the fusion splicer accommodating portion and the optical fiber cutter accommodating portion in the direction along the first placement surface. The support portion is iii contact with the optical fiber cutter holder which has rotated such that an angle formed by a line normal to the first placement surface and a line normal to the second placement surface is an acute angle, to support the optical fiber cutter holder.

The storage case includes the fusion splicer accommodating portion that can store the fusion splicer, and the optical fiber cutter accommodating portion that is disposed side by side with the fusion splicer accommodating portion to be able to store the optical fiber cutter. Therefore, the fusion splicer and the optical fiber cutter can be stored and carried together. In addition, in the storage case, the bottom surface of the optical fiber cutter is fixed to the second placement surface of the optical fiber cutter holder. The optical fiber cutter holder is supported to be rotatable around the rotating shaft separated from the plane including the first placement surface to which the bottom surface of the fusion splicer is fixed. Therefore, when the optical fiber cutter holder rotates from a state where the optical fiber cutter is stored in the optical fiber cutter accommodating portion, the optical fiber cutter is lifted. The optical fiber cutter holder which has rotated is in contact with and is supported on the support portion. The support portion is disposed between the fusion splicer accommodating portion and the optical fiber cutter accommodating portion in the direction along the first placement surface, and comes into contact with the optical fiber cutter holder such that the angle formed by the line normal to the first placement surface and the line normal to the second placement surface is an acute angle. In other words, since the support portion supports the optical fiber cutter holder, the direction of the first placement surface and the direction of the second placement surface are close to each other. The storage case can provide the fusion splicer and the optical fiber cutter for work while bringing the heights of work positions close to each other by the above operation. Incidentally, the "acute angle" referred to here may include 0°.

In such a manner, the storage case can store the fusion splicer and the optical fiber cutter together, and can be used as a workbench therefor. In addition, the optical fiber cutter is stored at a low position, and during work, the optical fiber cutter holder rotates to lift the optical fiber cutter from a storage position, so that the work position can be increased. Therefore, a waste space can be prevented from being formed below the optical fiber cutter during storage to reduce the size of the storage case.

In the storage case, the support portion may be adjacent to the fusion splicer accommodating portion, and the optical fiber cutter holder may be rotatable toward the fusion splicer accommodating portion. In this case, during work, the optical fiber cutter and the fusion splicer can be disposed close to each other, so that workability can be more increased.

The storage case may further include a base and a lid. The base forms a part of the fusion splicer accommodating portion including the first placement surface, and Opens in a normal direction of the first placement surface. The lid is connected to the base so as to block an opening of the base and to be openable and closeable with respect to the base, forms a remaining part of the fusion splicer accommodating portion, and includes the optical fiber cutter accommodating portion. In the storage case, in a state where the lid is closed with respect to the base, the rotating shaft may be close to the plane including the first placement surface, and the second placement surface may extend in a direction intersecting the plane. In addition, in a state where the lid is opened with respect to the base, the rotating shaft may be separated from the plane, and the second placement surface may be rotatable from a direction separated from the plane toward a direction approaching the plane. According to the embodiment, the lid can be opened to perform fusion splicing work, and after the fusion splicing work is completed, the lid can be closed to store the fusion splicer and the optical fiber cutter.

The storage case may further include a pair of shoulder belts attached to an outer surface of the lid. In this case, a worker can dispose the storage case in front of the body in a state where the pair of shoulder belts are hung on both shoulders, and can open the lid to perform fusion splicing work. Therefore, workability (particularly, workability at height such as on a pole or on a ladder) can more increased.

In the storage case, the optical fiber cutter accommodating portion may be located below the fusion splicer accommodating portion in an up and down direction during carriage which is defined by the pair of shoulder belts.

In the storage case, the fiber cutter holder and the rotating shaft may be attached to the lid. A first distance between the plane including the first placement surface and the rotating shaft in a state where the lid is opened with respect to the base may be longer than a second distance between the plane and the rotating shaft in a state where the lid is closed with respect to the base. In such a manner, since the position of the rotating shaft is changed between the state where the lid is opened and the state where the lid is closed, an internal space of the storage case can be efficiently used, so that the size of the storage case can be further reduced.

In the storage case, in a state where the lid is opened to a maximum extent with respect to the base, and in a state where the optical fiber cutter holder rotates toward the fusion splicer accommodating portion, and the optical fiber cutter holder comes into contact with the support portion, an angle formed by the plane including the first placement surface and a plane including the second placement surface may be 15' or less. In this case, the fusion splicer and the optical fiber cutter can be disposed without being greatly inclined with respect to each other, so that workability can be further increased. Incidentally, the plane including the first placement surface and the plane including the second placement surface may be parallel to each other.

In the storage case, in a state where the lid is opened to a maximum extent with respect to the base, an angle formed by the first placement surface of the base and an outer surface of the lid may be in a range of 68° to 86°. In such a manner, since the angle formed by the first placement surface and the outer surface of the lid is set to an angle slightly smaller than the right angle, the access of the worker to the fusion splicer is facilitated, so that workability can be more increased.

The storage case may further include the fusion splicer and the optical fiber cutter. In this case, the bottom surface of the fusion splicer may be fixed to the first placement surface, and the bottom surface of the optical fiber cutter may be fixed to the second placement surface. The first placement surface may be provided with a screw or a screw hole to fix the fusion splicer. The second placement surface may be provided with a screw or a screw hole to fix the optical fiber cutter.

In the storage case, the support portion may be a wall that extends from the plane including the first placement surface in the direction intersecting the plane. The optical fiber cutter holder may include a flat plate, of which one surface is provided with the second placement surface. In a state where the lid is opened with respect to the base, when the optical fiber cutter holder has rotated toward the fusion splicer accommodating portion, one end on an opposite side of the flat plate from the rotating shaft may come into contact with an upper portion of the wall to be supported on the upper portion. In this case, the rotation of the optical fiber cutter holder toward the fusion splicer accommodating portion can be stopped at a predetermined position, and the optical fiber cutter holder can be reliably supported. In addition, the wall may contain a foamed resin. In this case, the fusion splicer can be more reliably protected, and movement, sound, or the like caused by rotational operation of the optical fiber cutter holder can be absorbed.

In the storage case, one end of the base, which is adjacent to the lid, and one end of the lid, which is adjacent to the base, may be rotatably connected to each other, and when the lid rotates with respect to the base, the lid may be opened and closed with respect to the base. In this case, the storage case can be disposed in front of the body, and the base can be opened to perform fusion splicing work. Therefore, workability (particularly, workability at height such as on a pole or on a ladder) can more increased.

According to another aspect of the present disclosure, there is provided a storage case that is configured to store a fusion splicer that splices optical fibers by heat melting, and an optical fiber cutter that cuts an optical fiber together. The storage case includes a base, an optical fiber cutter holder, and a lid. The base includes a first placement surface which is configured such that the fusion splicer is placed on the first placement surface, and opens in a normal direction of the first placement surface. The optical fiber cutter holder includes a second placement surface which is configured such that the optical fiber cutter is placed on the second placement surface. The lid is connected to the base so as to be openable and closeable with respect to the base, and is configured to block an opening of the base when the lid is closed with respect to the base. The lid defines a space, which stores the optical fiber cutter, inside the lid. The optical fiber cutter holder is connected to the lid so as to be rotatable around a rotating shaft from a first position at which the optical fiber cutter is in a storage state to a second position at which the optical fiber cutter is in a usable state.

The storage case includes the first placement surface on which the fusion splicer is placed, and the second placement surface on which the optical fiber cutter is placed. Therefore, the fusion splicer and the optical fiber cutter can be stored and carried in one storage case. In addition, the optical fiber cutter holder is connected to the lid so as to be rotatable around the rotating shaft from the first position at which the optical fiber cutter is in a storage state to the second position at which the optical fiber cutter is in a usable state. Therefore, the optical fiber cutter can take different positions and postures between a storage state and a usable state. For example, the optical fiber cutter is stored at a low position, and during work, the optical fiber cutter holder rotates to lift the optical fiber cutter from a storage position, so that the work position can be increased. Therefore, a waste space can be prevented from being formed below the optical fiber cutter during storage, so that the size of the storage case can be reduced.

The storage case may further include the fusion splicer and the optical fiber cutter. In this case, a bottom surface of the fusion splicer may be fixed to the first placement surface, and a bottom surface of the optical fiber cutter may be fixed to the second placement surface. The first placement surface may be provided with a screw or a screw hole to fix the fusion splicer. The second placement surface may be provided with a screw or a screw hole to fix the optical fiber cutter.

The storage case may further include a wall that extends from a plane including the first placement surface in a direction intersecting the plane, in which the wall, together with the first placement surface, defines a space that stores the fusion splicer. In a state where the lid is closed with respect to the base, the second placement surface may extend in the direction intersecting the plane including the first placement surface. In a state where the lid is opened with respect to the base, the second placement surface or a back surface with respect to the second placement surface may face the plane including the first placement surface. In this case, the optical fiber cutter holder can reliably rotate from the first position at which the optical fiber cutter is in a storage state to the second position at which the optical fiber cutter is in a usable state, and during storage, a waste space can be prevented from being formed below the optical fiber cutter.

In the storage case, the optical fiber cutter holder may include a flat plate, of which one surface is provided with the second placement surface. When the optical fiber cutter holder has rotated with respect to the lid from the first position to the second position, one end on an opposite side of the flat plate from the rotating shaft may come into contact with an upper portion of the wall to be supported on the upper portion. In this case, the rotation of the optical fiber cutter holder from the first position to the second position can be stopped at a predetermined position, and the optical fiber cutter holder can be reliably supported.

[Details of Embodiment of Present Disclosure]

A specific example of a storage case of the present disclosure will be described below with reference to the drawings. Incidentally, it is intended that the present invention is not limited to the example and is implied by the claims and includes all changes within the concept and the scope equivalent to the claims. In the following description, the same reference signs will be assigned to the same components in the description of the drawings, and duplicate descriptions will be omitted.

Figure 2:
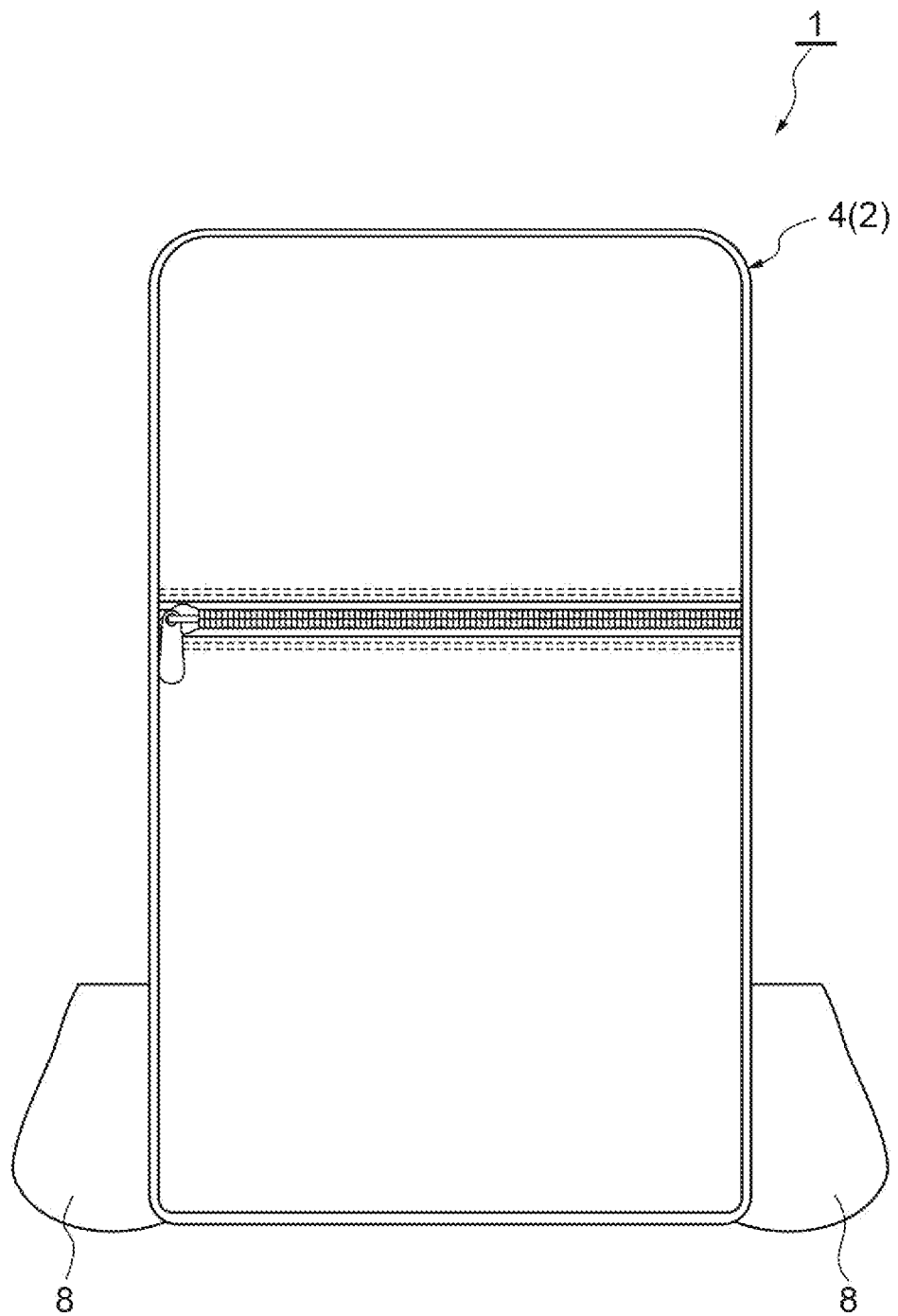
FIG. 2 is a rear view illustrating the external appearance of the storage case according to one embodiment, and illustrates a state where the storage case is closed.
Figure 3:
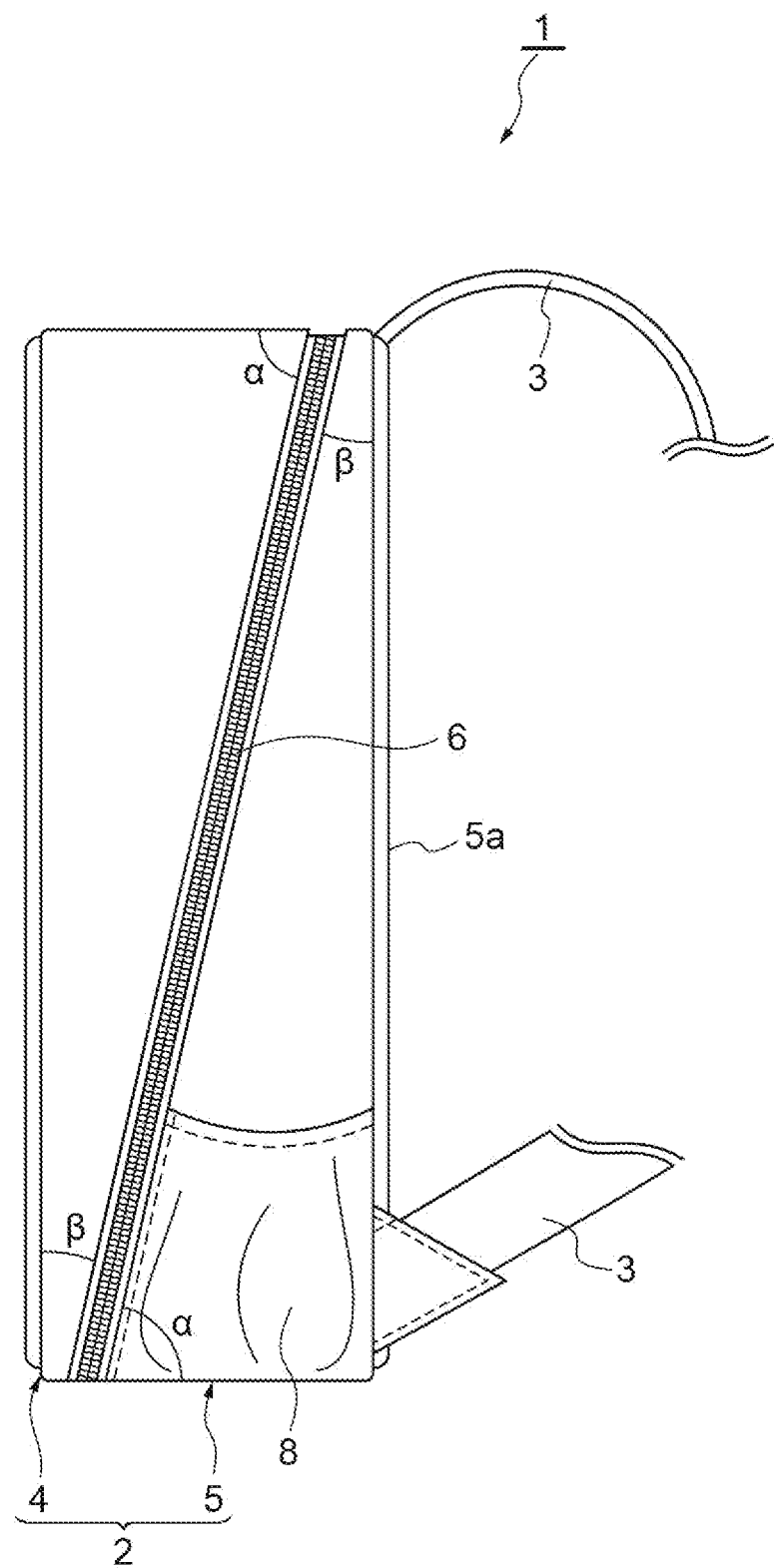
FIG. 3 is a side view illustrating the external appearance of the storage case according to one embodiment, and illustrates a state where the storage case is closed.
Figure 4:
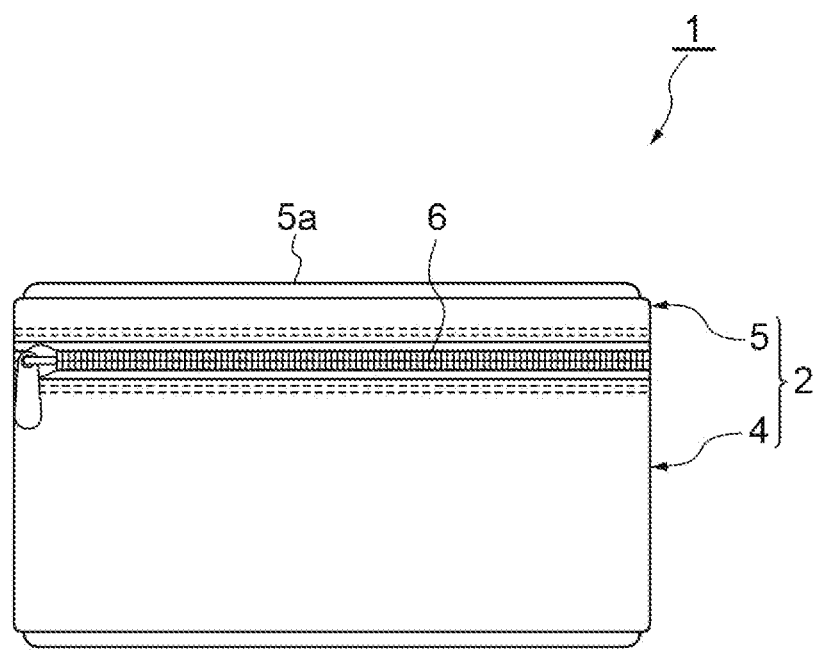
FIG. 4 is a top view illustrating the external appearance of the storage case according to one embodiment, and illustrates a state where the storage case is closed.
Figure 5:
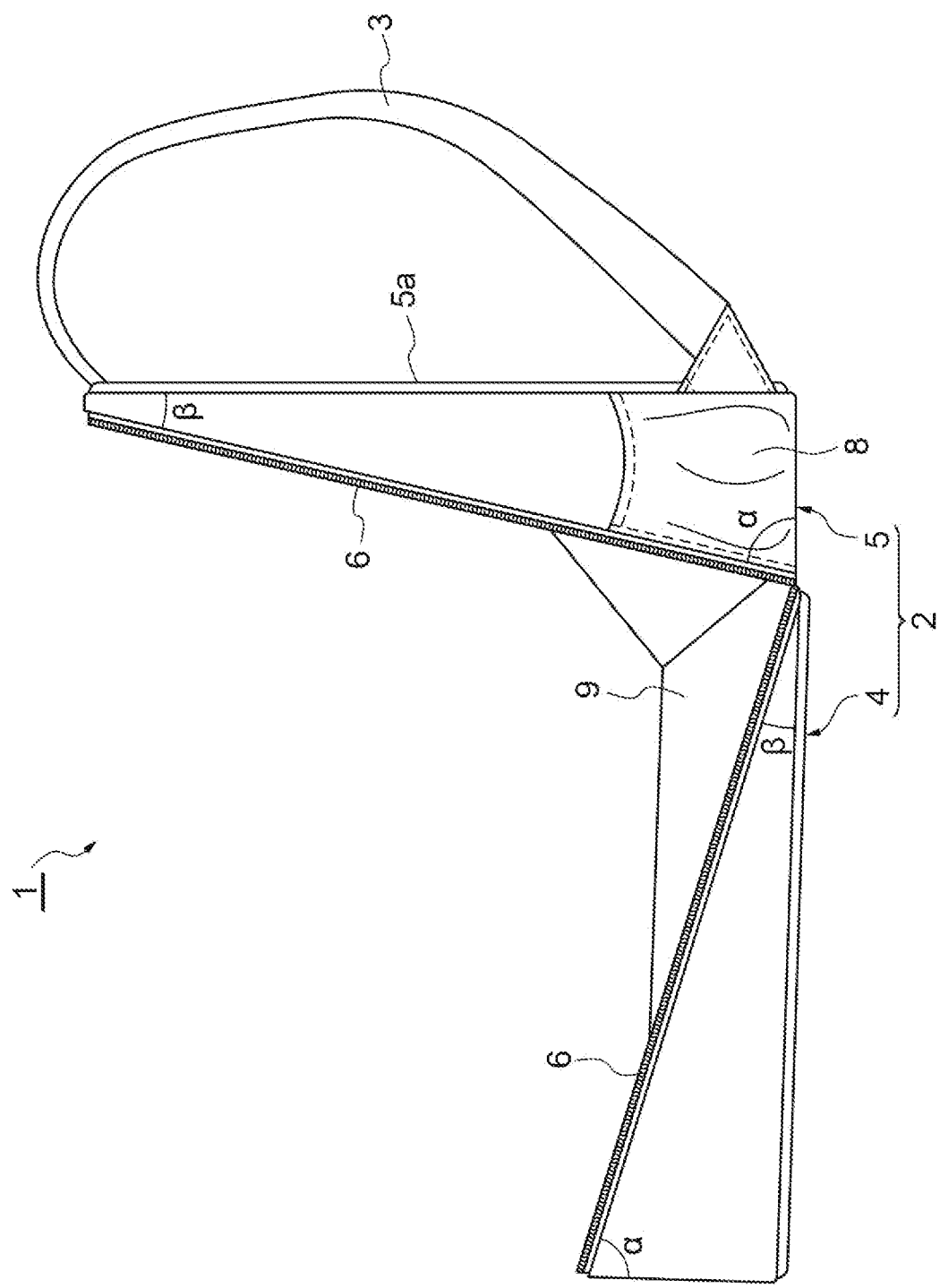
FIG. 5 is a side view illustrating the external appearance of the storage case according to one embodiment, and illustrates a state where the storage case is opened.

FIGS. 1 to 5 are views illustrating the external appearance of the storage case according to one embodiment. FIG. 1 is a front view of the storage case, FIG. 2 is a rear view of the storage case, FIGS. 3 and 5 are side views of the storage case, and FIG. 4 is a top view of the storage case. FIGS. 1 to 4 illustrate a state where the storage case is closed, and FIG. 5 illustrates a state where the storage case is opened. The storage case can store a fusion splicer that splices optical fibers by heating, and an optical fiber cutter that cuts an optical fiber together. In addition, the storage case can also serve as a workbench (work tray).

As illustrated in FIGS. 1 to 5, a storage case 1 has an external appearance similar to that of a backpack having a substantially rectangular parallelepiped shape. The storage case 1 includes a main body 2 and a pair of shoulder belts 3. The main body 2 includes a base 4 and a lid 5. The plan shapes of the base 4 and the lid 5 are a rectangular shape. In addition, the side shapes of the base 4 and the lid 5 are a right triangular shape. Among three internal angles of the right triangular shape, other internal angles α and β excluding a right internal angle satisfy α>β. The base 4 and the lid 5 are rotatably connected to each other at one ends thereof (a top of the base 4, which corresponds to the internal angle β, and a top of the lid 5, which corresponds to the internal angle α), and can be opened and closed. In a closed state, an edge portion of the base 4 and an edge portion of the lid 5 are fixed to each other via a zipper 6. In addition, a side edge portion of the base 4, which is close to the lid 5, and a side edge portion of the lid 5, which is close to the base 4, are connected to each other via a cloth 9 (refer to FIG. 5). The cloth 9 limits the opening angle between the base 4 and the lid 5. The cloth 9 is foldable.

The pair of shoulder belts 3 are attached to an outer surface 5a (surface on a side opposite to the base 4) of the lid 5. One end of each of the shoulder belts 3 is attached to one end portion of the outer surface 5a of the lid 5 in a longitudinal direction (up and down direction) of the storage case 1. The other end of each of the shoulder belts 3 is attached to the other end portion of the outer surface 5a of the lid 5 in the direction. In addition, one shoulder belt 3 is attached to one side of the outer surface 5a with respect to a center line C1 (refer to FIG. 1) of the storage case 1 along the direction. The other shoulder belt 3 is attached to the other side of the outer surface 5a with respect to the center line C1. If necessary, a chest strap 7 which connects the pair of shoulder belts 3 to each other may be provided. If necessary, a bottle pocket 8 which stores a beverage container or the like may be provided on at least one of a pair of side surfaces of the main body 2.

Figure 6:
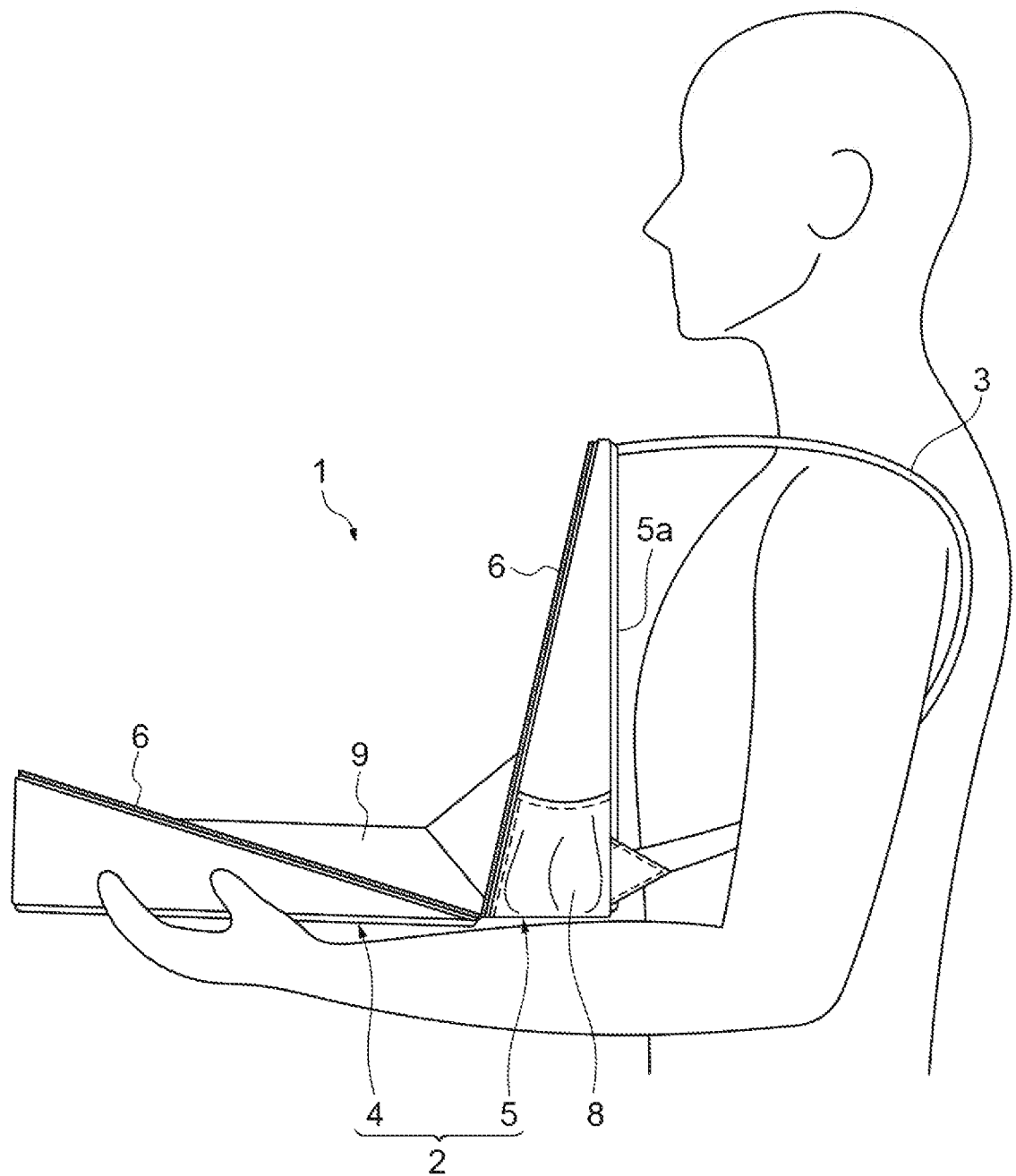
FIG. 6 illustrates a mode in which a worker holds the storage case.

FIG. 6 illustrates a mode in which a worker holds the storage case 1. As illustrated in FIG. 6, when fusion splicing work is performed, the storage case 1 is disposed in front of the body of the worker. Then, in a state where the pair of shoulder belts 3 are hung on both shoulders of the worker, the outer surface 5a of the lid 5 is in contact with the chest of the worker. In a state where the lid 5 is opened, the base 4 is located at substantially the same height as that of the abdomen of the worker.

Figure 7:
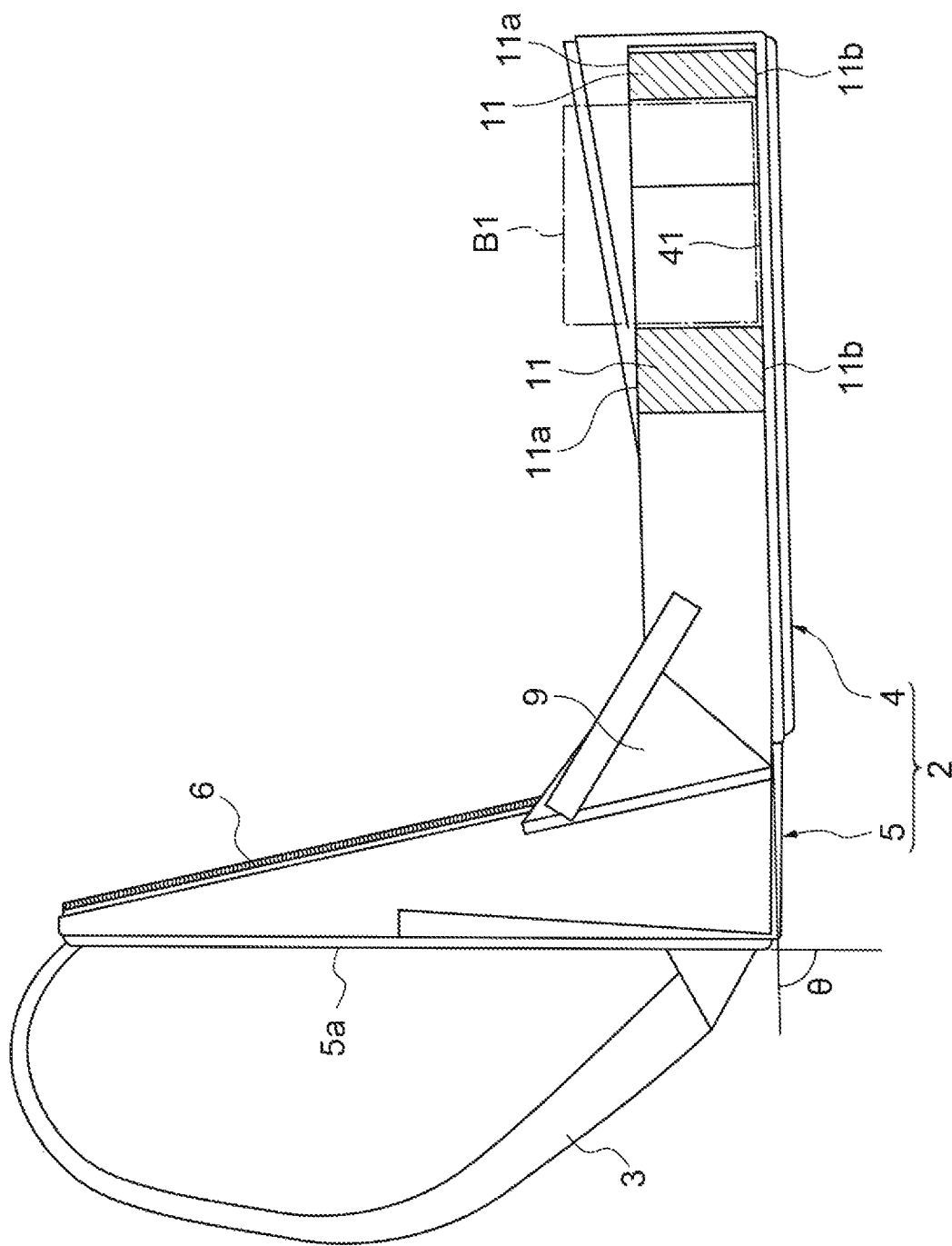
FIG. 7 is a view illustrating a cross section of the storage case cut along a direction D1.
Figure 8:
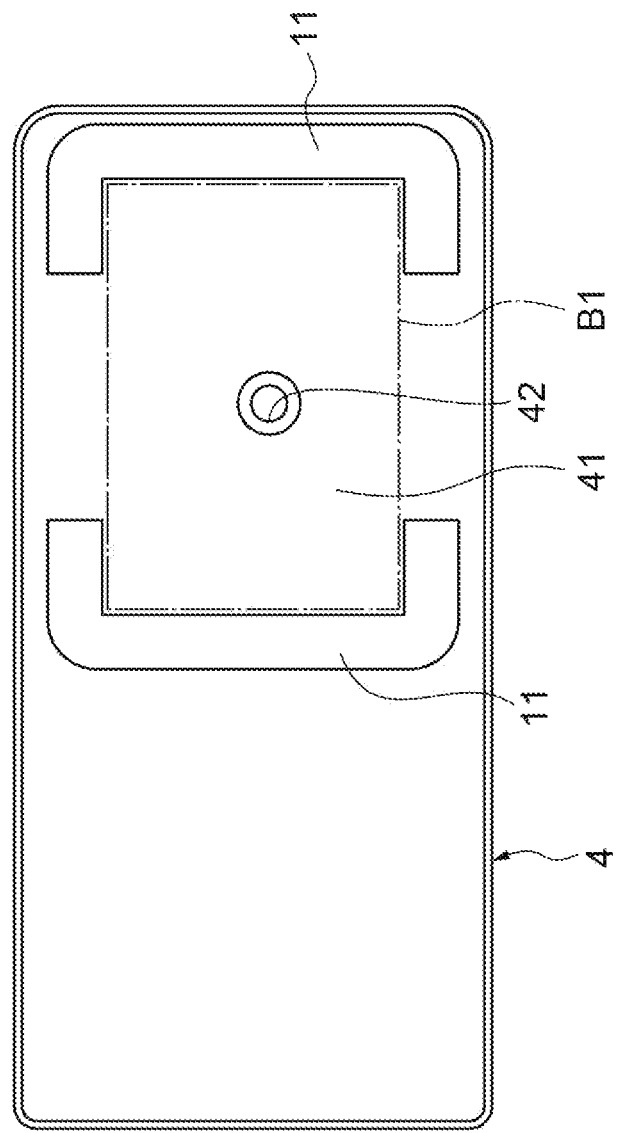
FIG. 8 is a plan view of a base of the storage case illustrated in FIG. 1.

FIG. 7 is a view illustrating a side cross section of the storage case 1 cut along the longitudinal direction. FIG. 8 is a plan view of the base 4. As illustrated in FIGS. 7 and 8, the main body 2 includes a fusion splicer accommodating portion (first space) B1. The fusion splicer accommodating portion B1 is a space that can store the fusion splicer, and the plan shape thereof has a substantially rectangular shape according to the outer shape of the fusion splicer. A part of the fusion splicer accommodating portion B1 is formed by the base 4, and the remaining part of the fusion splicer accommodating portion B1 is formed by the lid 5. The fusion splicer accommodating portion B1 includes a first placement surface 41 that is flat. The first placement surface 41 is a part of an inner surface of a bottom plate of the base 4, and partitions the fusion splicer accommodating portion B1 and an external space of the main body 2 off from each other. A bottom surface of the fusion splicer is fixed to the fusion splicer accommodating portion B1. The first placement surface 41 is configured to fix the bottom surface of the fusion splicer. Specifically, a screw hole 42 having a circular shape and to fix the bottom surface of the fusion splicer by screwing or the like is formed at substantially the center of the fusion splicer accommodating portion B1. A screw fix the fusion splicer may be provided instead of the screw hole 42. The first placement surface 41 may have an area of the same size or greater than that of the bottom surface of the fusion splicer. The base 4 opens in a normal direction of the first placement surface 41. The lid 5 blocks the opening in a state where the lid 5 is closed. Accordingly, the fusion splicer accommodating portion B1 which is a storage space for the fusion splicer is defined. In a state where the lid 5 is opened to the maximum extent with respect to the base 4, an angle θ formed by the first placement surface 41 of the base 4 and the outer surface 5a of the lid 5 is, for example, from 68° to 86°.

A pair of cushioning members 11 which fix the position of the fusion splicer are disposed around the fusion splicer accommodating portion B1 on the first placement surface 41. The cushioning members 11 are walls extending in a direction intersecting the first placement surface 41 (perpendicular direction in the present embodiment), and the plan shapes thereof are a substantially U shape. The cushioning members 11 interpose the fusion splicer from the front and the rear to fix the position of the fusion splicer and to protect the fusion splicer. In the present embodiment, the cushioning members 11 are adjacent to the fusion splicer accommodating portion B1. In other words, the pair of cushioning members 11, together with the first placement surface 41, define the fusion splicer accommodating portion B1. The forming material of the cushioning member 11 is a foamed resin (for example, an expandable polyethylene foam). Accordingly, a fusion splicer F to be described later can be more reliably protected, and movement, sound, or the like caused by rotational operation of an optical fiber cutter holder 12 to be described later can be absorbed. As illustrated in FIG. 7, the shape of a cross section of the cushioning member 11, which is vertical to an extending direction thereof, is a rectangular shape. Namely, the cushioning member 11 has an upper surface 11a and a lower surface 11b which are flat and are parallel to each other. The lower surface 11b is in contact with the first placement surface 41. The upper surface 11a faces the same direction as a facing direction of the first placement surface 41. In other words, a normal direction of the upper surface 11a substantially coincides with the normal direction of the first placement surface 41.

Figure 9:
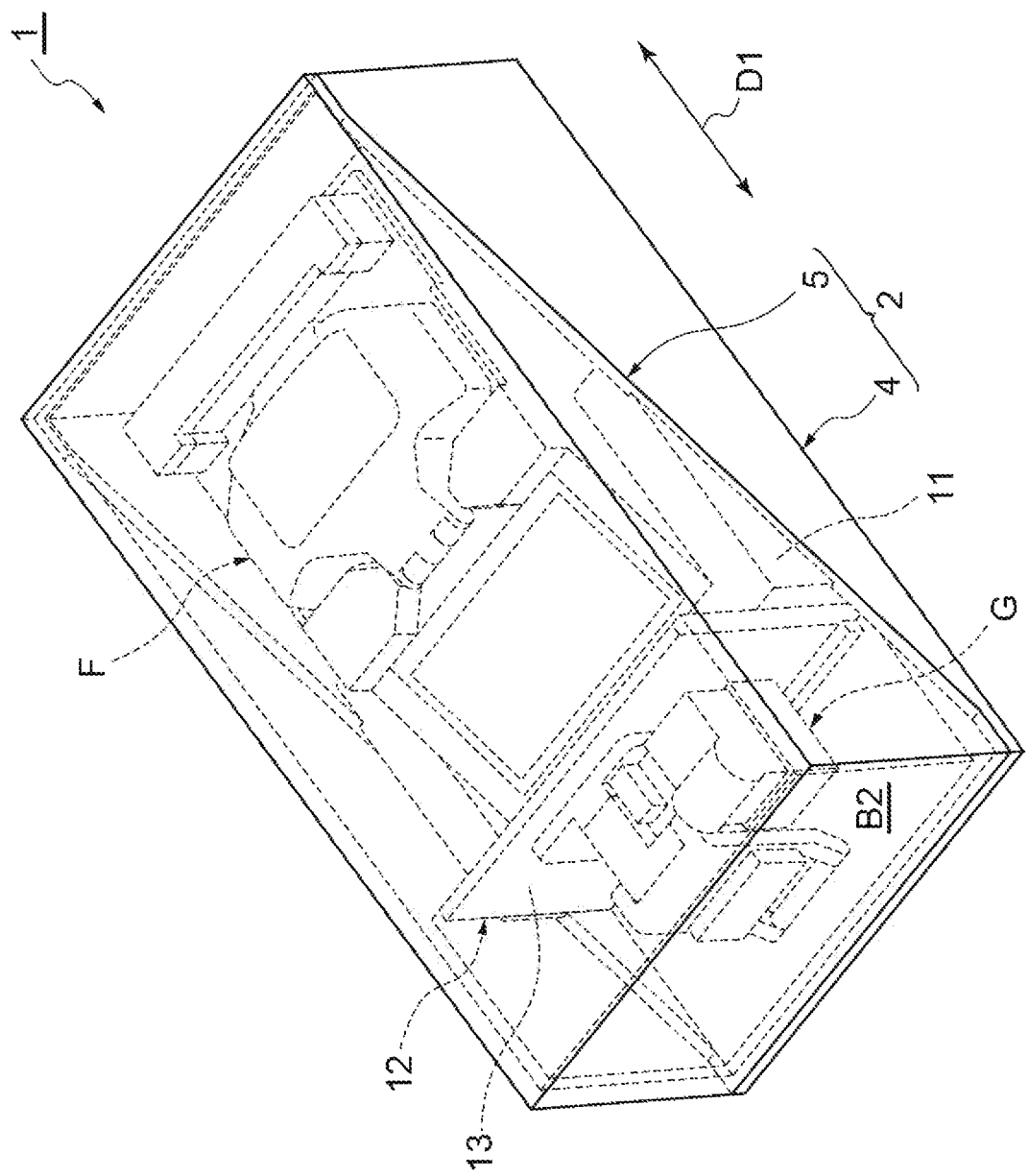
FIG. 9 is a perspective view schematically illustrating a main body in a storage state where the base and a lid of the storage case illustrated in FIG. 1 are closed to each other, and illustrates through the inside of the main body.

FIG. 9 is a perspective view schematically illustrating the main body 2 in a storage state where the base 4 and the lid 5 are closed to each other. In FIG. 9, the inside of the main body 2 is illustrated by hidden lines (broken lines). In FIG. 9, the fusion splicer F and an optical fiber cutter G are illustrated together. The fusion splicer F includes, for example, a pair of electrodes for arc discharge which fusion splices a pair of optical fibers. The optical fiber cutter G includes, for example, a cutting tool such as a rotating cutter which cuts each of the optical fibers at a predetermined position. The fusion splicer F is stored on the first placement surface 41 in the fusion splicer accommodating portion B1 of the main body 2, and the position of the fusion splicer F is fixed with the pair of cushioning members 11, a screw, and the like. Meanwhile, the optical fiber cutter G can be stored in an optical fiber cutter accommodating portion (second space) B2 of the main body 2. The optical fiber cutter accommodating portion B2 is provided in the lid 5, and is disposed side by side with the fusion splicer accommodating portion B1 in a direction along the first placement surface 41 (an up and down direction D1 of the storage case 1 in the present embodiment). The optical fiber cutter accommodating portion B2 is located below the fusion splicer accommodating portion B1 in the up and down direction (namely, the direction D1) during carriage which is defined by the pair of shoulder belts 3.

The main body 2 further includes the optical fiber cutter holder 12 attached to the lid 5. The optical fiber cutter holder 12 is a flat plate-shaped member that partitions the fusion splicer accommodating portion B1 and the optical fiber cutter accommodating portion B2 off from each other, and the shape of the optical fiber cutter holder 12 when viewed in a thickness direction thereof is, for example, a rectangular shape. The optical fiber cutter holder 12 extends along a plane intersecting the direction D1 in a state where the lid 5 is closed. One plate surface of the optical fiber cutter holder 12 forms a second placement surface 13 that is flat and is configured to fix a bottom surface of the optical fiber cutter G. The second placement surface 13 is provided with a screw hole or a screw 12a (refer to FIGS. 12A to 12C), and the bottom surface of the optical fiber cutter G is fixed to the second placement surface 13 with, for example, a screw.

Figure 10:
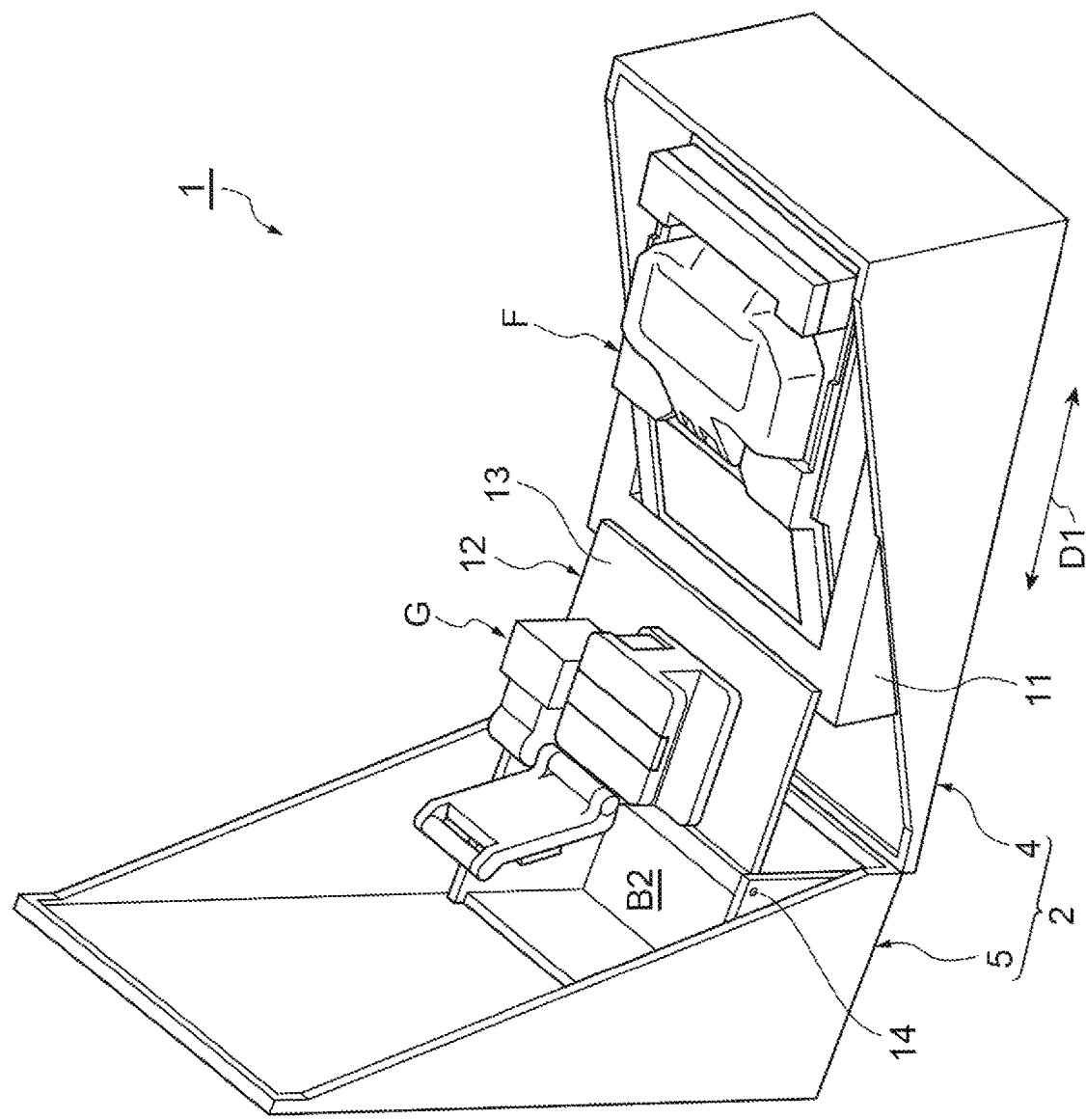
FIG. 10 is a perspective view illustrating a state during fusion splicing work for which the lid is opened with respect to the base, and describes when an optical fiber cutter is in use.
Figure 11:
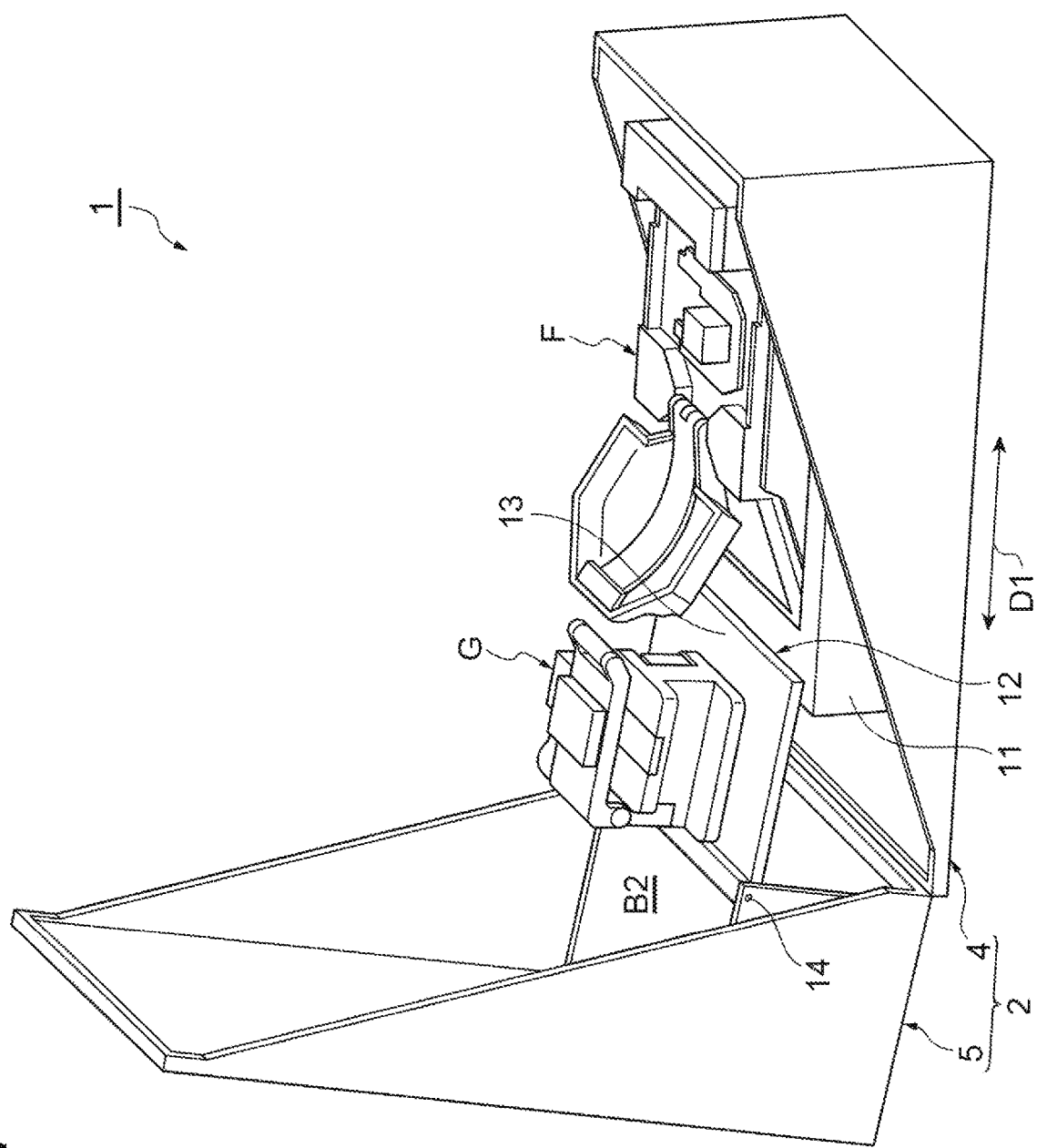
FIG. 11 is a perspective view illustrating a state during fusion splicing work for which the lid is opened with respect to the base, and describes when a fusion splicer is in use.

FIGS. 10 and 11 are perspective views illustrating a state during fusion splicing work for which the lid 5 is opened with respect to the base 4. FIG. 10 describes when the optical fiber cutter G is in use, and FIG. 11 describes when the fusion splicer F is in use thereafter. As illustrated in FIGS. 9 to 11, the optical fiber cutter holder 12 is supported to be rotatable around a rotating shaft 14 with respect to the lid 5. The rotating shaft 14 is supported on right triangular side plates of the lid 5. The rotating shaft 14 extends along a plane including the first placement surface 41 (inner surface of the bottom plate of the base 4 in the present embodiment), and in a direction intersecting (for example, perpendicular to) the direction D1. The rotating shaft 14 is provided to be parallel to and separated from a connection portion (rotation axis of the lid 5) between the base 4 and the lid 5.

Figure 12A:
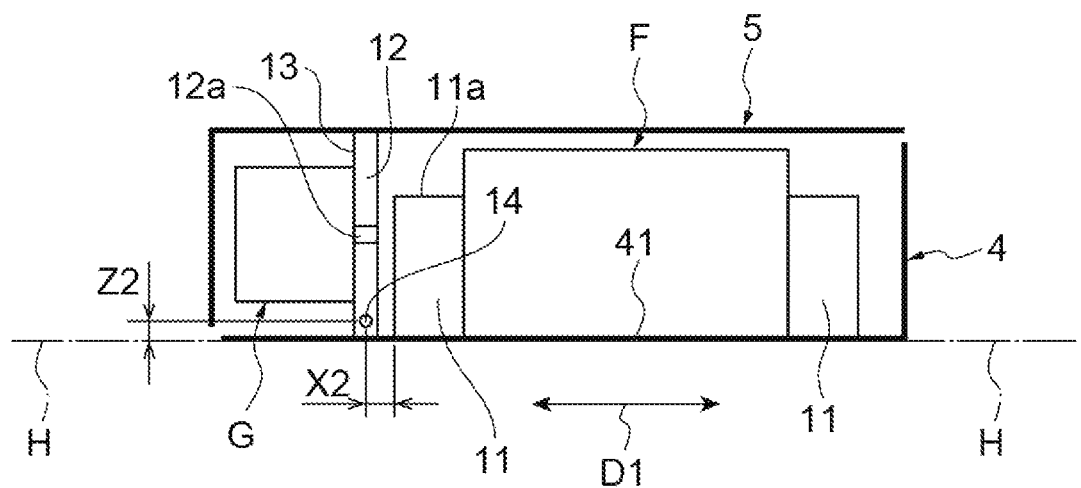
FIG. 12A is a view schematically illustrating operation of the storage case.
Figure 12B:
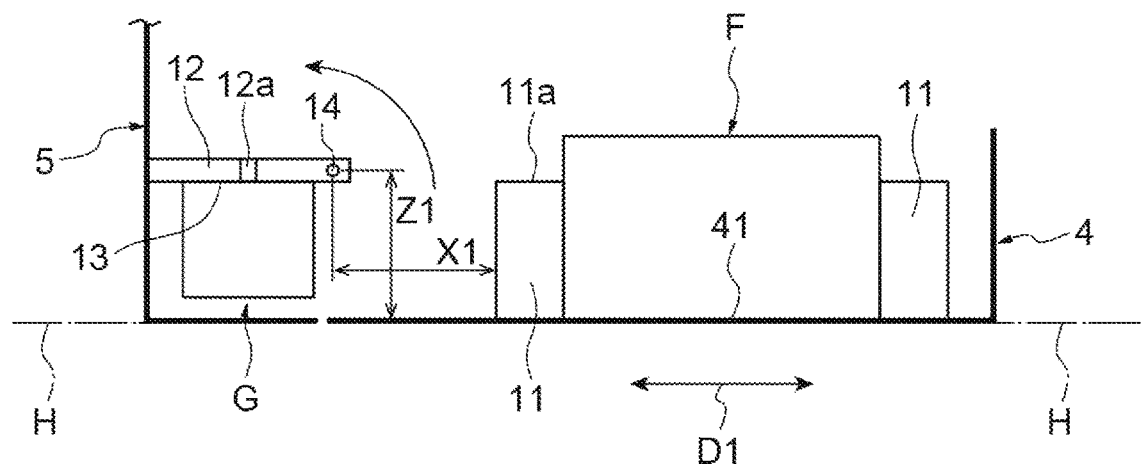
FIG. 12B is a view schematically illustrating operation of the storage case.
Figure 12C:
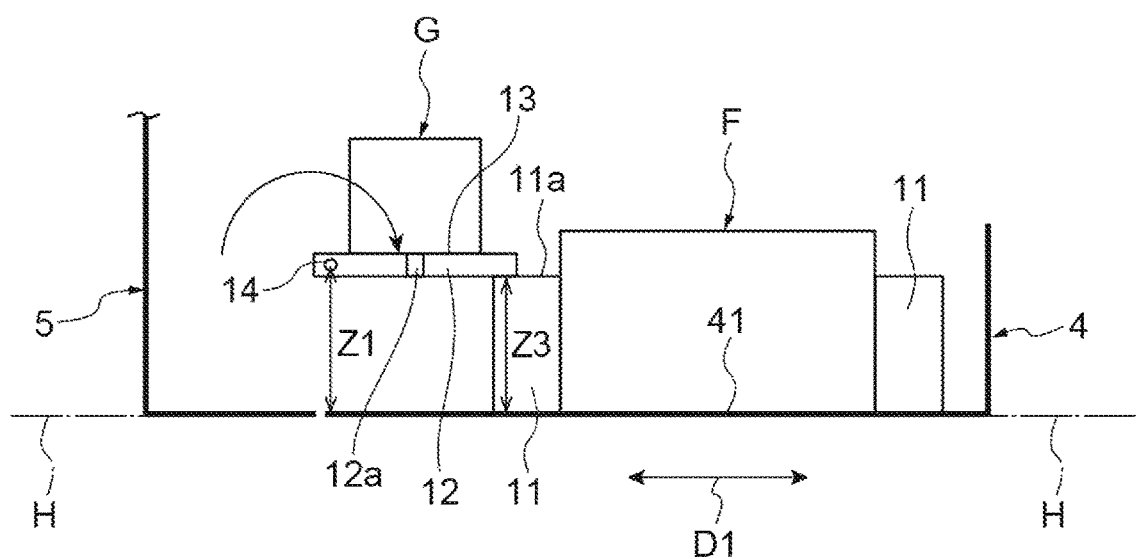
FIG. 12C is a view schematically illustrating operation of the storage case.

FIGS. 12A to 12C are views schematically illustrating operation of the storage case 1. FIG. 12A illustrates a storage state where the lid 5 is closed with respect to the base 4. FIG. 12B illustrates a state where the lid 5 is opened with respect to the base 4. FIG. 12C illustrates a state where the optical fiber cutter holder 12 has rotated from a first position at which the optical fiber cutter G is in a storage state to a second position at which the optical fiber cutter G is in a usable state. The rotating shaft 14 moves relative to the base 4 according to opening and closing operation of the lid 5. Namely, the rotating shaft 14 is close to the bottom plate of the base 4 in a state where the lid 5 is closed (FIG. 12A), and when the lid 5 is opened, as illustrated in FIG. 12B, the rotating shaft 14 moves on an arc-shaped trajectory centered on the rotation axis of the lid 5 to be away from the bottom plate of the base 4. In other words, the rotating shaft 14 is close to a plane H including the first placement surface 41 (inner surface of the bottom plate of the base 4 in the present embodiment) in a storage state where the lid 5 is closed, and moves to a position, which is separated from the plane H, in a working state (refer to FIGS. 10 and 11) where the lid 5 is opened. Therefore, a distance (first distance) Z1 between the plane H and the rotating shaft 14 in a state where the lid 5 is opened is longer than a distance (second distance) Z2 between the plane H and the rotating shaft 14 in a state where the lid 5 is closed. As illustrated in FIG. 12A, the second placement surface 13 extends in a direction intersecting (in the present embodiment, perpendicular to) the plane H in a state where the lid 5 is closed. As illustrated in FIGS. 12B and 12C, in a state where the lid 5 is opened, the second placement surface 13 or a back surface with respect thereto extends in a direction substantially parallel to the plane H, and faces the plane H including the first placement surface 41. In addition, the rotating shaft 14 is close to one cushioning member 11 in a storage state where the lid 5 is closed, and moves to a position, which is separated from the one cushioning member 11 in the direction D1, in a working state where the lid 5 is opened (refer to FIGS. 10 and 11). Therefore, a distance (third distance) X1 between the cushioning member 11 and the rotating shaft 14 in a state where the lid 5 is opened is longer than a distance (fourth distance) X2 between the cushioning member 11 and the rotating shaft 14 in a state where the lid 5 is closed.

In addition, since the rotating shaft 14 is located in the direction D1 with respect to the fusion splicer accommodating portion B1, and extends in the direction intersecting the direction D1, the optical fiber cutter holder 12 is rotatable toward the fusion splicer accommodating portion B1. Namely, in a state where the lid 5 is opened, the second placement surface 13 is rotatable from a direction separated from the plane H toward a direction approaching the plane H (direction indicated by an arrow in FIG. 12C). Since the rotating shaft 14 is separated from the cushioning member 11 in a state where the lid 5 is opened, when the optical fiber cutter holder 12 rotates during work, as illustrated in FIG. 12C, a tip portion (end portion farthest from the rotating shaft 14, and one end opposite to the rotating shaft 14) of the optical fiber cutter holder 12 comes into contact with the upper surface 11a of the cushioning member 11 to be supported on the upper surface 11a, Namely, in the present embodiment, the one cushioning member 11 disposed between the fusion splicer accommodating portion B1 and the optical fiber cutter accommodating portion B2 in the direction D1 functions as a support portion that supports the optical fiber cutter holder 12. At this time, the tip portion of the optical fiber cutter holder 12 and the upper surface 11a of the cushioning member 11 come into contact with each other such that the angle formed by a line normal to the first placement surface 41 and a line normal to the second placement surface 13 is an acute angle. Incidentally, the acute angle may include 0°.

In one example, in a state where the lid 5 is opened to the maximum extent, and in a state where the optical fiber cutter holder 12 is in contact with the cushioning member 11, the angle formed by the plane H including the first placement surface 41 and a plane including the second placement surface 13 is 15° or less. In addition, in one example, in a state where the lid 5 is opened to the maximum extent, a height Z3 of a portion (upper surface 11a in the present embodiment) of the cushioning member 11, which is in contact with the optical fiber cutter holder 12, with respect to the plane H including the first placement surface 41 and the first distance Z1 are substantially equal to each other. In that case, the first placement surface 41 and the second placement surface 13 are substantially parallel to each other, and both the first placement surface 41 and the second placement surface 13 face the same direction. Here, "Z3 and Z1 being substantially equal to each other" includes not only when both are strictly equal to each other, but also when both are slightly different from each other. Similarly, "the first placement surface 41 and the second placement surface 13 being substantially parallel to each other" includes not only when both are strictly parallel to each other, but also when the angle formed by two surfaces is within 15°. Incidentally, the optical fiber cutter holder 12 including the second placement surface 13 may rotate such that a normal direction of the second placement surface 13 in a storage state (FIG. 12B) and a normal direction of the second placement surface 13 in a use state (FIG. 12C) form an angle of 165° to 180°.

Effects obtained by the storage case 1 of the present embodiment described above will be described. As described above, the storage case 1 includes the fusion splicer accommodating portion B1 that can store the fusion splicer F, and the optical fiber cutter accommodating portion B2 that is disposed side by side with the fusion splicer accommodating portion B1 to be able to store the optical fiber cutter G. Therefore, the fusion splicer F and the optical fiber cutter G can be stored and carried together. In addition, as described above, in the storage case 1, the bottom surface of the optical fiber cutter G is fixed to the second placement surface 13 of the optical fiber cutter holder 12. Further, the optical fiber cutter holder 12 is supported to be rotatable around the rotating shaft 14 separated from the plane including the first placement surface 41 to which the bottom surface of the fusion splicer F is fixed. Therefore, when the optical fiber cutter holder 12 rotates from a state where the optical fiber cutter G is stored in the optical fiber cutter accommodating portion B2, the optical fiber cutter G is lifted. The optical fiber cutter holder 12 which has rotated is in contact with and is supported on the cushioning member 11. The cushioning member 11 is disposed between the fusion splicer accommodating portion B1 and the optical fiber cutter accommodating portion B2 in the direction D1 along the first placement surface 41, and comes into contact with the optical fiber cutter holder 12 such that the angle formed by the line normal to the first placement surface 41 and the line normal to the second placement surface 13 is an acute angle. In other words, since the cushioning member 11 supports the optical fiber cutter holder 12, the direction of the first placement surface 41 and the direction of the second placement surface 13 are close to each other. The storage case 1 can provide the fusion splicer F and the optical fiber cutter G for work while bringing the heights of the work positions close to each other by the above operation.

In such a manner, the storage case 1 of the present embodiment can store the fusion splicer F and the optical fiber cutter G together, and can be used as the workbench therefor. In addition, the optical fiber cutter G is stored at a low position, and during work, the optical fiber cutter holder 12 rotates to lift the optical fiber cutter G from a storage position, so that the work position can be increased. Therefore, a waste space can be prevented from being formed below the optical fiber cutter G during storage to reduce the size of the storage case 1.

As in the present embodiment, the cushioning member 11 may be adjacent to the fusion splicer accommodating portion B1, and the optical fiber cutter holder 12 may be rotatable toward the fusion splicer accommodating portion B1. In this case, during work, the optical fiber cutter G and the fusion splicer F can be disposed close to each other, so that workability can be more increased.

As in the present embodiment, the storage case 1 may include the base 4 and the lid 5. The base 4 forms a part of the fusion splicer accommodating portion B1 including the first placement surface 41, and opens in the normal direction of the first placement surface 41. The lid 5 is connected to the base 4 so as to block the opening of the base 4 and to be openable and closeable with respect to the base 4, forms the remaining part of the fusion splicer accommodating portion B1, and includes the optical fiber cutter accommodating portion B2. In a state where the lid 5 is closed with respect to the base 4, the rotating shaft 14 is close to the plane H including the first placement surface 41, and the second placement surface 13 extends in the direction intersecting the plane H. In a state where the lid 5 is opened with respect to the base 4, the rotating shaft 14 is separated from the plane H, and the second placement surface 13 is rotatable from the direction separated from the plane H toward the direction approaching the plane H. In this case, the lid 5 can be opened to perform fusion splicing work, and after the fusion splicing work is completed, the lid 5 can be closed to store the fusion splicer F and the optical fiber cutter G.

As in the present embodiment, the storage case 1 may include the pair of shoulder belts 3. The pair of shoulder belts 3 are attached to the outer surface 5a of the lid 5. In this case, the worker can dispose the storage case 1 in front of the body in a state where the pair of shoulder belts 3 are hung on both shoulders, and can open the lid 5 to perform fusion splicing work. Therefore, workability (particularly, workability at height such as on a pole or on a ladder) can more increased.

As in the present embodiment, the optical fiber cutter accommodating portion B2 may be located below the fusion splicer accommodating portion B1 in the up and down direction (direction D1) during carriage which is defined by the pair of shoulder belts 3. In this case, during work, the optical fiber cutter G is located on a worker side with respect to the fusion splicer F. In typical fusion splicing work, (1) the optical fiber cutter G cuts an optical fiber in which a sheath of an end portion has been removed, and (2) after the fusion splicer F fusion splices the optical fibers by heat melting, (3) a periphery of a fusion spliced portion is reinforced, and (4) the optical fibers are temporarily stored on a rear surface side of the fusion splicer F. The worker can carry on a series of the works while moving the optical fibers from a near side to a far side, so that workability can be further increased.

As in the present embodiment, the optical fiber cutter holder 12 and the rotating shaft 14 may be attached to the lid 5, and the first distance between the plane including the first placement surface 41 and the rotating shaft 14 in a state where the lid 5 is opened with respect to the base 4 may be longer than the second distance between the plane and the rotating shaft 14 in a state where the lid 5 is closed with respect to the base 4. In such a manner, since the position of the rotating shaft 14 is changed between the state where the lid 5 is opened and the state where the lid 5 is closed, an internal space of the storage case 1 can be efficiently used, so that the size of the storage case 1 can be further reduced.

As in the present embodiment, in a state where the lid 5 is opened to the maximum extent with respect to the base 4, and in a state where the optical fiber cutter holder 12 is in contact with the cushioning member 11, the angle formed by the plane H including the first placement surface 41 and the plane including the second placement surface 13 may be 15° or less. In such a state, the fusion splicer F and the optical fiber cutter G can be disposed without being greatly inclined with respect to each other, so that workability can be further increased.

As in the present embodiment, in a state where the lid 5 is opened to the maximum extent with respect to the base 4, the height Z3 of the portion of the cushioning member 11, which is in contact with the optical fiber cutter holder 12, with respect to the plane H including the first placement surface 41 and the first distance Z1 may be substantially equal to each other. In this case, the fusion splicer F and the optical fiber cutter G can be disposed without being greatly inclined with respect to each other, so that workability can be further increased.

As in the present embodiment, in a state where the lid 5 is opened to the maximum extent with respect to the base 4, the angle formed by the first placement surface 41 of the base 4 and the outer surface 5a of the lid 5 may be in a range of 68' to 86°. In such a manner, since the angle formed by the first placement surface 41 and the outer surface 5a of the lid 5 is set to an angle slightly smaller than the right angle, the access of the worker to the fusion splicer F is facilitated, so that workability can be more increased.

The storage case according to the present disclosure is not limited to the embodiment described above, and other various modifications can be made. For example, in the embodiment, the storage case 1 includes the pair of shoulder belts 3, and has a form in which work can be performed in a state where the pair of shoulder belts 3 are hung on the shoulders of the worker; however, the configuration of carrying the storage case 1 is not limited thereto, and other various components (strap and the like) can be used. In addition, in the embodiment, the optical fiber cutter G is located on the worker side with respect to the fusion splicer F; however, the positional relationship between the optical fiber cutter G and the fusion splicer F is not limited thereto, and the fusion splicer F may be located on the worker side with respect to the optical fiber cutter G.

REFERENCE SIGNS LIST

1: storage case, 2: main body, 3: shoulder belt, 4: base, 5: lid, 5a: outer surface, 6: zipper, 7: chest strap, 8: bottle pocket, 9: cloth, 11: cushioning member, 11a: upper surface, 11b: lower surface, 12: optical fiber cutter holder, 12a: screw hole or screw, 13: second placement surface, 14: rotating shaft, 41: first placement surface, 42: screw hole, B2: optical fiber cutter accommodating portion, D1: up and down direction, direction, B1: fusion splicer accommodating portion, C1: center line, F: fusion splicer, G: optical fiber cutter, H: plane, Z1: first distance, Z2: second distance, X1: third distance, X2: fourth distance, α, β: internal angle.

The invention claimed is:

1. A storage case that is configured to store a fusion splicer that splices optical fibers by heat melting and an optical fiber cutter that cuts an optical fiber together, and also serves as a work tray, the storage case comprising:
  a fusion splicer accommodating portion configured to store the fusion splicer, the fusion splicer accommodating portion including a first placement surface configured to fix a bottom surface of the fusion splicer,
  an optical fiber cutter accommodating portion configured to store the optical fiber cutter, the optical fiber cutter accommodation portion being disposed side by side with the fusion splicer accommodating portion in a direction along the first placement surface;
  an optical fiber cutter holder that has a second placement surface configured to fix a bottom surface of the optical fiber cutter, and is supported to be rotatable around a rotating shaft separated from a plane including the first placement surface;
  a support portion that is disposed between the fusion splicer accommodating portion and the optical fiber cutter accommodating portion in the direction along the first placement surface, and is in contact with the optical fiber cutter holder which has rotated such that an angle formed by a line normal to the first placement surface and a line normal to the second placement surface is an acute angle, to support the optical fiber cutter holder;
  a base that forms a part of the fusion splicer accommodating portion including the first placement surface, and opens in a normal direction of the first placement surface; and
  a lid that is connected to the base to block an opening of the base and to be openable and closeable with respect to the base, forms a remaining part of the fusion splicer accommodating portion, and includes the optical fiber cutter accommodating portion.

2. The storage case according to claim 1, wherein the support portion is adjacent to the fusion splicer accommodating portion, and
  the optical fiber cutter holder is rotatable toward the fusion splicer accommodating portion.

3. The storage case according to claim 1,
  wherein in a state where the lid is closed with respect to the base, the rotating shaft is close to the plane including the first placement surface, and the second placement surface extends in a direction intersecting the plane, and in a state where the lid is opened with respect to the base, the rotating shaft is separated from the plane, and the second placement surface is rotatable from a direction separated from the plane toward a direction approaching the plane.

4. The storage case according to claim 3, further comprising:
a pair of shoulder belts attached to an outer surface of the lid.

5. The storage case according to claim 4, wherein the optical fiber cutter accommodating portion is located below the fusion splicer accommodating portion in an up and down direction during carriage which is defined by the pair of shoulder belts.

6. The storage case according to claim 3, wherein the optical fiber cutter holder and the rotating shaft are attached to the lid, and
a first distance between the plane including the first placement surface and the rotating shaft in a state where the lid is opened with respect to the base is longer than a second distance between the plane and the rotating shaft in a state where the lid is closed with respect to the base.

7. The storage case according to claim 3, wherein in a state where the lid is opened to a maximum extent with respect to the base, and in a state where the optical fiber cutter holder rotates toward the fusion splicer accommodating portion, and the optical fiber cutter holder comes into contact with the support portion, an angle formed by the plane including the first placement surface and a plane including the second placement surface is 15° or less.

8. The storage case according to claim 3, wherein in a state where the lid is opened to a maximum extent with respect to the base, an angle formed by the first placement surface of the base and an outer surface of the lid is in a range of 68° to 86°.

9. The storage case according to claim 3, further comprising:
the fusion splicer and the optical fiber cutter,
wherein the bottom surface of the fusion splicer is fixed to the first placement surface, and
the bottom surface of the optical fiber cutter is fixed to the second placement surface.

10. The storage case according to claim 3, wherein the support portion is a wall that extends from the plane including the first placement surface in the direction intersecting the plane.

11. The storage case according to claim 10, wherein the optical fiber cutter holder includes a flat plate, of which one surface is provided with the second placement surface, and
in a state where the lid is opened with respect to the base, when the optical fiber cutter holder has rotated toward the fusion splicer accommodating portion, one end on an opposite side of the flat plate from the rotating shaft comes into contact with an upper portion of the wall to be supported on the upper portion.

12. The storage case according to claim 10, wherein the wall contains a foamed resin.

13. The storage case according to claim 3, wherein one end of the base, which is adjacent to the lid, and one end of the lid, which is adjacent to the base, are rotatably connected to each other, and when the lid rotates with respect to the base, the lid is opened and closed with respect to the base.

14. The storage case according to claim 1, wherein the first placement surface is provided with a screw or a screw hole to fix the fusion splicer.

15. The storage case according to claim 1, wherein the second placement surface is provided with a screw or a screw hole to fix the optical fiber cutter.

16. A storage case that is configured to store a fusion splicer that splices optical fibers by heat melting, and an optical fiber cutter that cuts an optical fiber, the storage case comprising:
a base that includes a first placement surface configured to place the fusion splicer thereon, and opens in a normal direction of the first placement surface;
an optical fiber cutter holder including a second placement surface configured to place the optical fiber cutter thereon;
a lid connected to the base to be openable and closeable with respect to the base, the lid being configured to block an opening of the base when the lid is closed with respect to the base to define therein a space that stores the optical fiber cutter; and
the fusion splicer and the optical fiber cutter,
wherein the optical fiber cutter holder is connected to the lid to be rotatable around a rotating shaft from a first position at which the optical fiber cutter is in a storage state to a second position at which the optical fiber cutter is in a usable state,
a bottom surface of the fusion splicer is fixed to the first placement surface, and
a bottom surface of the optical fiber cutter is fixed to the second placement surface.

17. The storage case according to claim 16, wherein the first placement surface is provided with a screw or a screw hole to fix the fusion splicer, and
the second placement surface is provided with a screw or a screw hole to fix the optical fiber cutter.

18. A storage case that is configured to store a fusion splicer that splices optical fibers by heat melting, and an optical fiber cutter that cuts an optical fiber, the storage case comprising:
a base that includes a first placement surface configured to place the fusion splicer thereon, and opens in a normal direction of the first placement surface;
an optical fiber cutter holder including a second placement surface configured to place the optical fiber cutter thereon;
a lid connected to the base to be openable and closeable with respect to the base, the lid being configured to block an opening of the base when the lid is closed with respect to the base to define therein a space that stores the optical fiber cutter; and
a wall that extends from a plane including the first placement surface in a direction intersecting the plane, the wall, together with the first placement surface, defining a space that stores the fusion splicer,
wherein the optical fiber cutter holder is connected to the lid to be rotatable around a rotating shaft from a first position at which the optical fiber cutter is in a storage state to a second position at which the optical fiber cutter is in a usable state,
in a state where the lid is closed with respect to the base, the second placement surface extends in the direction intersecting the plane including the first placement surface, and
in a state where the lid is opened with respect to the base, the second placement surface or a back surface with respect to the second placement surface faces the plane including the first placement surface.

19. The storage case according to claim 18, wherein the optical fiber cutter holder includes a flat plate, of which one surface is provided with the second placement surface, and when the optical fiber cutter holder has rotated with respect to the lid from the first position to the second position, one end on an opposite side of the flat plate from the rotating shaft comes into contact with an upper portion of the wall to be supported on the upper portion.

* * * * *